United States Patent [19]
Helmkamp et al.

[11] Patent Number: 5,265,150
[45] Date of Patent: Nov. 23, 1993

[54] AUTOMATICALLY CONFIGURING WIRELESS PBX SYSTEM

[75] Inventors: David J. Helmkamp, Jersey City; James W. Smith, Middletown, both of N.J.

[73] Assignee: AT&T Bell Laboratories, Murray Hill, N.J.

[21] Appl. No.: 647,943

[22] Filed: Jan. 30, 1991

[51] Int. Cl.$^5$ .................. H04M 11/00; H04B 7/15; H04B 1/00
[52] U.S. Cl. ....................... 379/58; 379/59; 379/60; 455/11.1; 455/17; 455/56.1
[58] Field of Search ............ 379/58, 56, 60, 59; 455/33.3, 33.4, 54.1, 31, 39, 18, 15, 33.2, 10, 56.1, 17, 16

[56] References Cited

U.S. PATENT DOCUMENTS

| | | | |
|---|---|---|---|
| 4,112,257 | 9/1978 | Frost | 379/60 |
| 4,284,848 | 8/1981 | Frost | 455/11.1 |
| 4,347,626 | 8/1982 | Wenzel | 455/18 |
| 4,528,654 | 7/1985 | Morais | 379/58 |
| 4,578,815 | 3/1986 | Persinotti | 455/15 |
| 4,659,878 | 4/1987 | Dinkins | 455/33.2 |
| 4,672,658 | 6/1987 | Kavehrad | 379/63 |
| 4,803,738 | 2/1989 | Ikeda | 455/10 |
| 4,833,702 | 5/1989 | Shitara et al. | 379/62 |
| 4,881,271 | 11/1989 | Yamauchi et al. | 455/56.1 |
| 4,941,200 | 7/1990 | Leslie et al. | 455/17 |
| 4,972,456 | 11/1990 | Kaczmarek et al. | 379/59 |
| 5,095,529 | 3/1992 | Comroe et al. | 455/16 |
| 5,129,096 | 7/1992 | Burns | 455/18 |
| 5,133,001 | 7/1992 | Böhm | 379/58 |
| 5,170,488 | 12/1992 | Furuya | 455/56.1 |

FOREIGN PATENT DOCUMENTS 0107542 5/1987 Japan .................... 455/39

Primary Examiner—Jin F. Ng
Assistant Examiner—William D. Cumming
Attorney, Agent, or Firm—Samuel R. Williamson

[57] ABSTRACT

A wireless PBX system provides ease of installation without site engineering or trial-and-error placement of components within the system. In its basic form, the wireless PBX system consists of only two types of components: a control unit including an radio frequency transceiver; and fixed location terminals, such as telephones and voice/data stations, which also include radio frequency transceivers. Portable handsets are optionally included in the system to allow for customer mobility. Installation of the PBX system is achieved simply by placing the system components in the desired locations at a premises, plugging them into line power, and performing some simple programming steps including a final step of initiating an automatic configuring process. Through this process, the system automatically configures itself for optimum operation in view of the radio environment and placement of components within the system at the customer premises. In the operation of this process, the control unit exchanges various radio messages with the terminals, decides which terminals should also serve as repeaters for linking those more distantly located terminals, and determines the appropriate frame structure for the system. A positive display indication at the control unit, following the end of the automatic configuring process, shows that all terminals have been linked and that the system is operating normally.

20 Claims, 11 Drawing Sheets

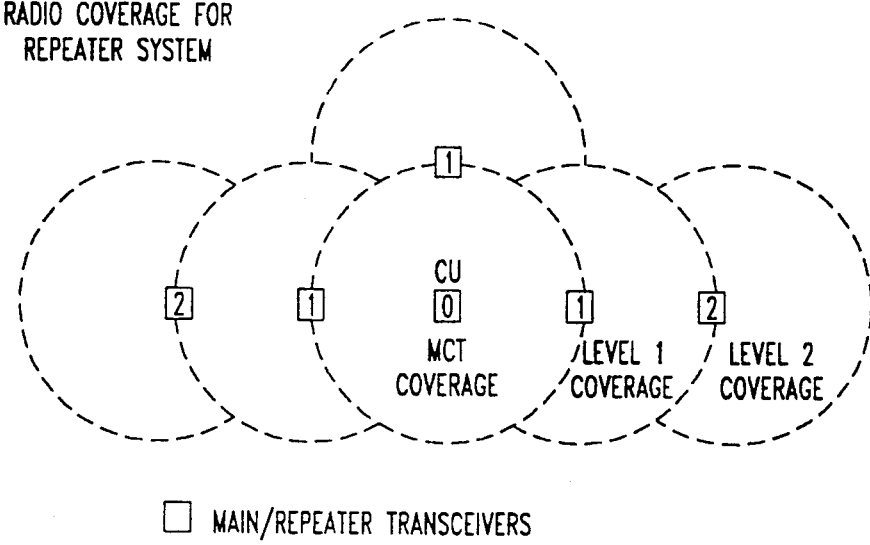
FIG. 3
RADIO COVERAGE FOR REPEATER SYSTEM
☐ MAIN/REPEATER TRANSCEIVERS
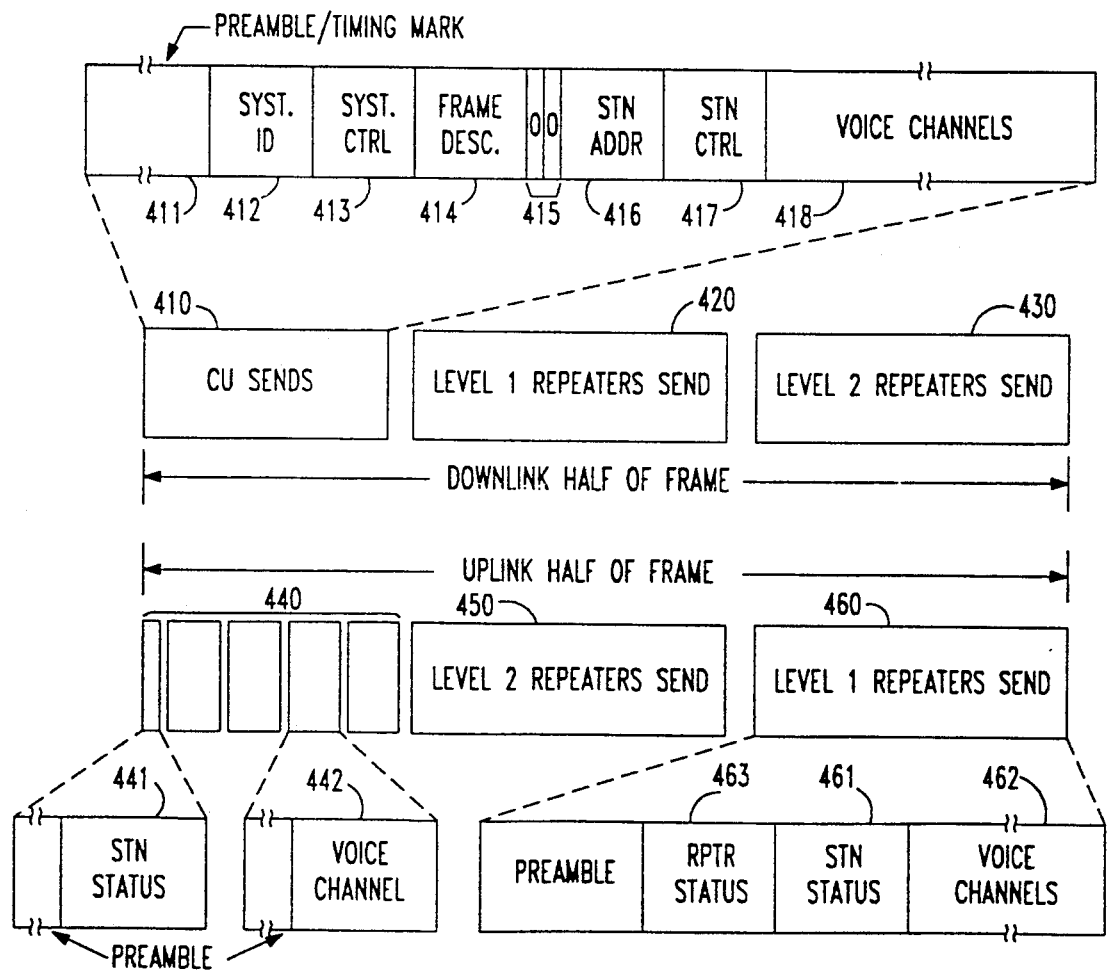
FIG. 4 BASIC RADIO LINK PROTOCOL

FIG. 5 AUTO-CONFIGURATION TABLE

STATION ADDRESS

| | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|
| FIRST PASS NO REPEATERS | O | FO | O | FO | FO | P | O | FO | FO | P | O | FO | P | O | O |
| SECOND PASS LEVEL 1 REPEATERS | F1 | R1 | O | | | | F1 | | R1 | | | | | P | F1,L |
| THIRD PASS LEVEL 2 REPEATERS | | F2 | | | | | R2 | | | | F2 | | | | |

O – NO RESPONSE
F – FIXED STATION
P – PORTABLE STATION
R – REPEATER
L – HIGHEST ADDRESS
FO – FIXED STATION FOUND WITH NO REPEATER
F1 – FIXED STATION FOUND WITH ONE REPEATER
F2 – FIXED STATION FOUND WITH TWO REPEATERS
R1 – LEVEL 1 REPEATER
R2 – LEVEL 2 REPEATER

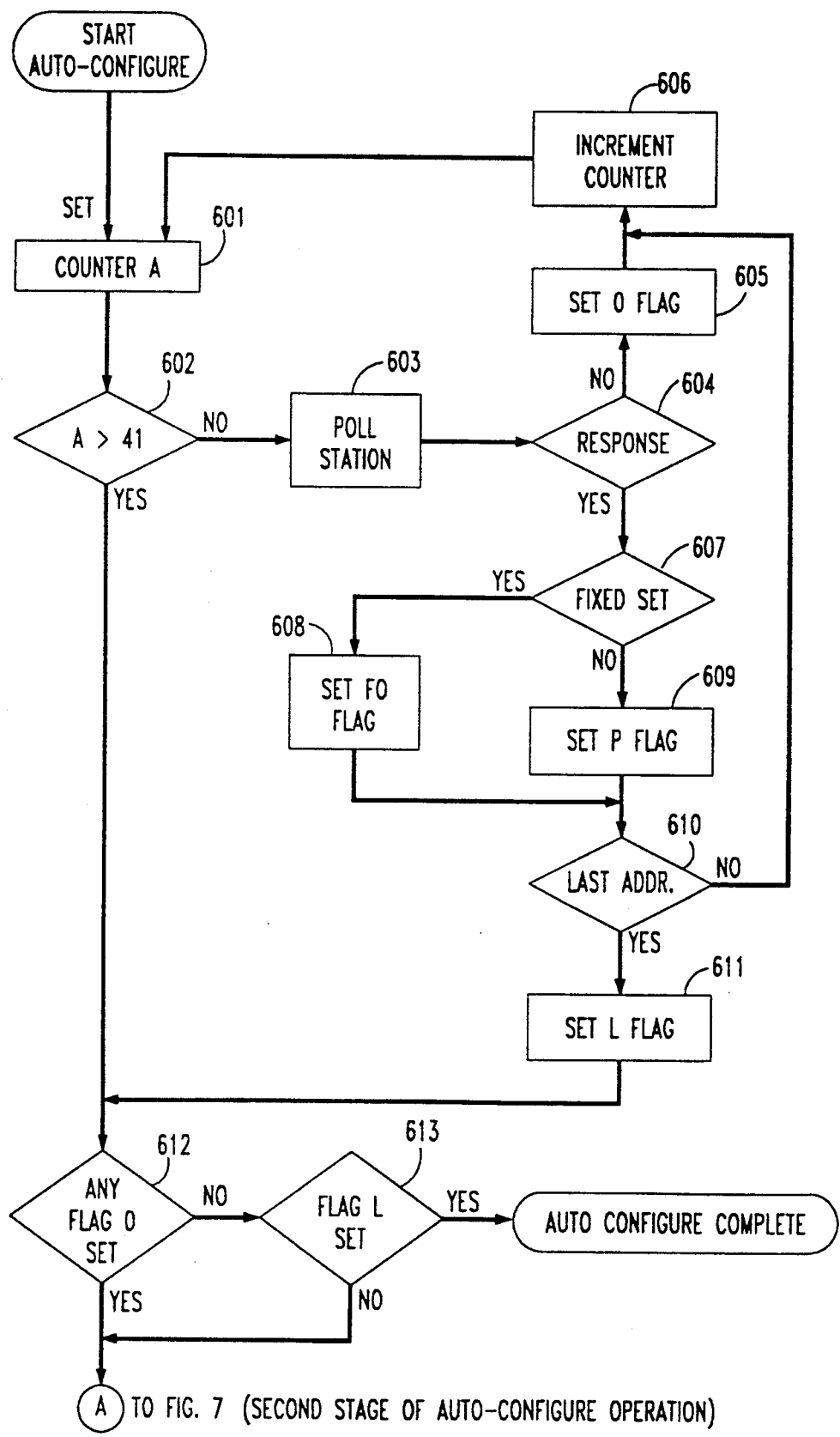
FIG. 6 FIRST STAGE OF AUTO-CONFIGURE OPERATION

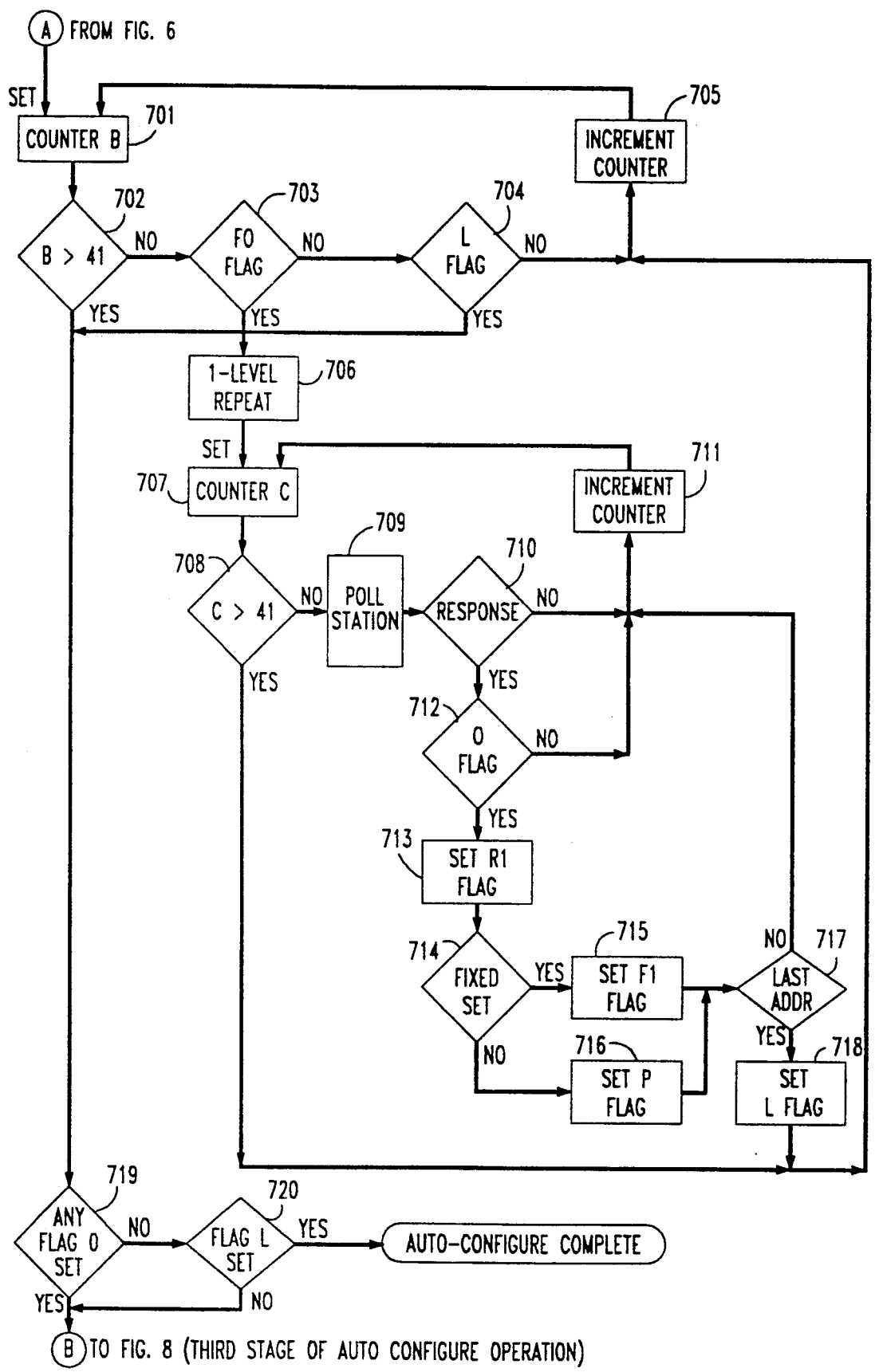

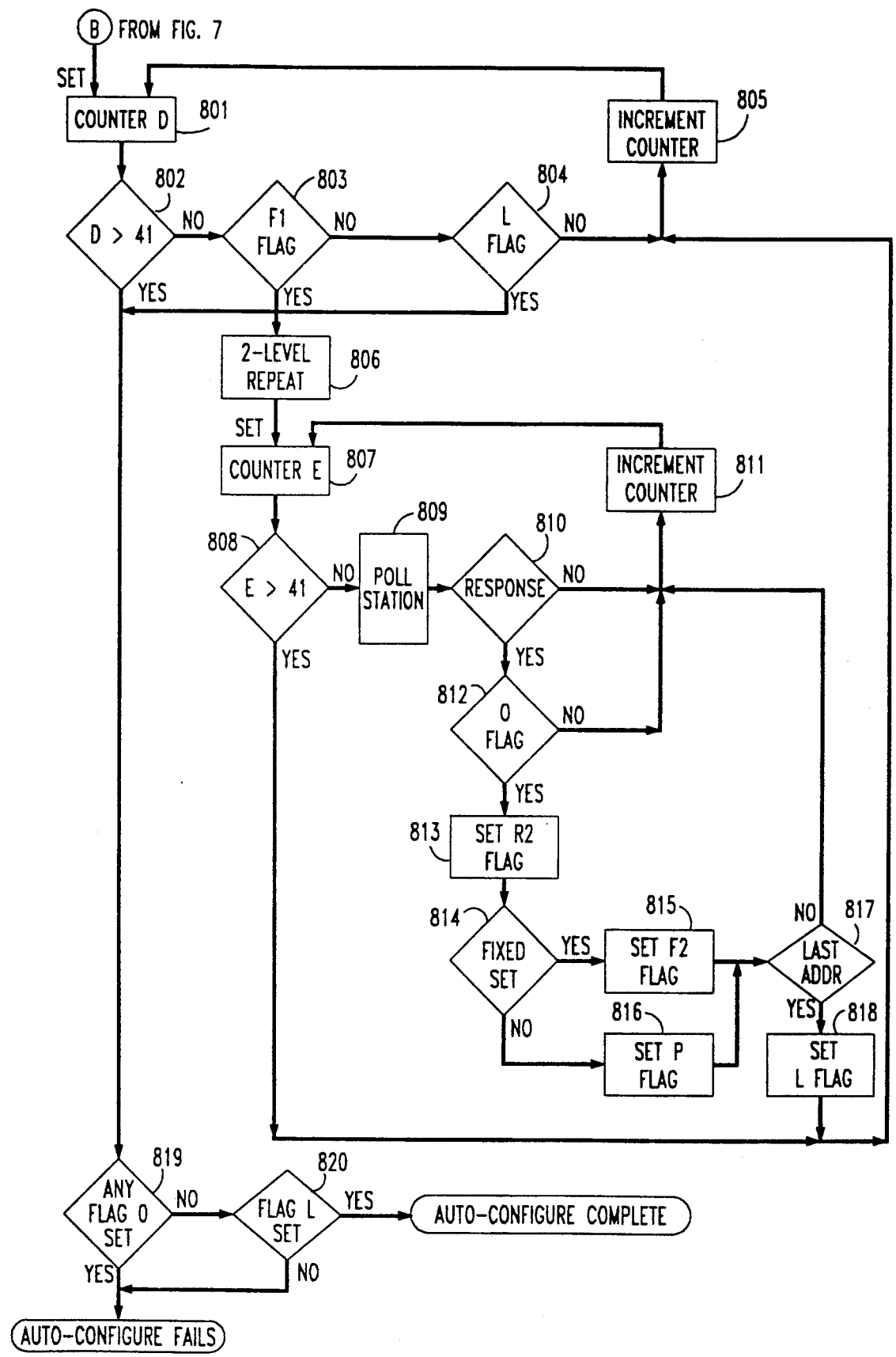
FIG. 8 THIRD STAGE OF AUTO-CONFIGURE OPERATION

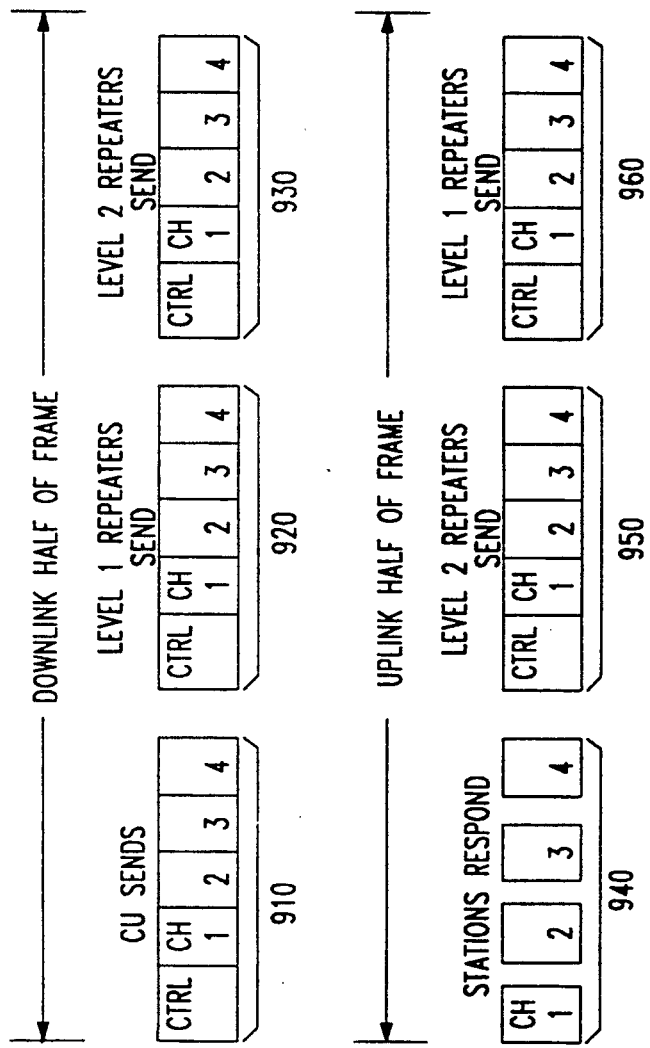
FIG. 9 FRAME STRUCTURE FOR UNCONSTRAINED SYSTEM

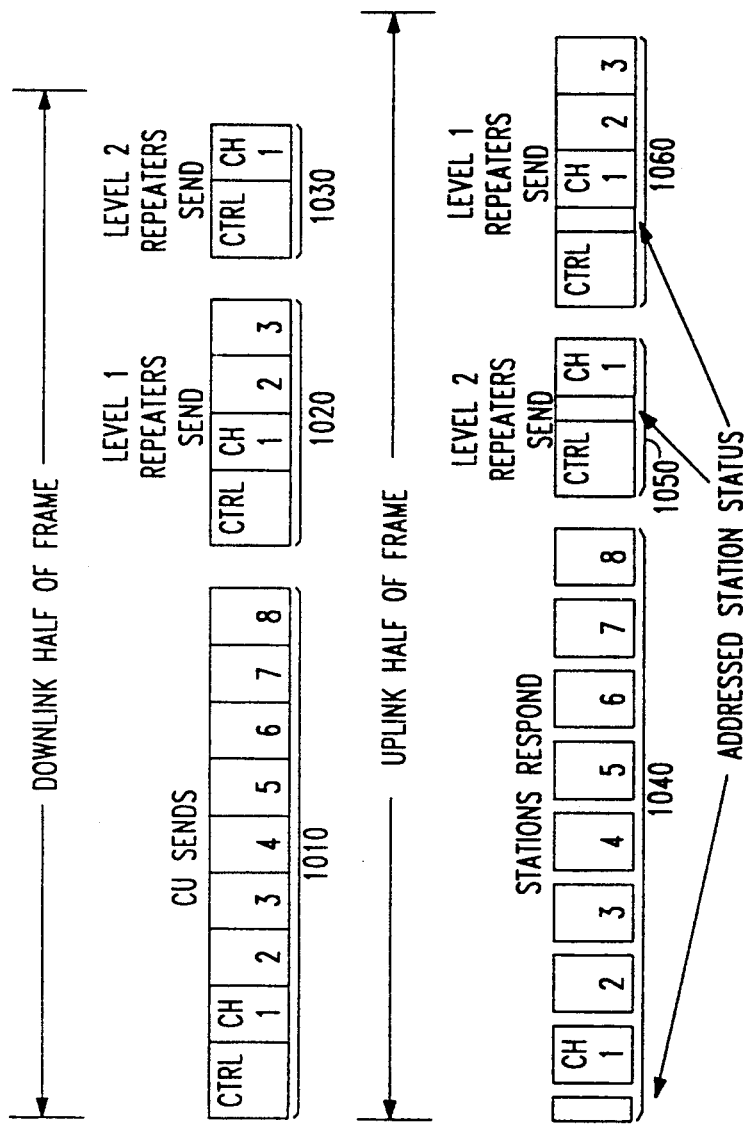
FIG. 10 FRAME STRUCTURE FOR SPECIFIC TUNED SYSTEM

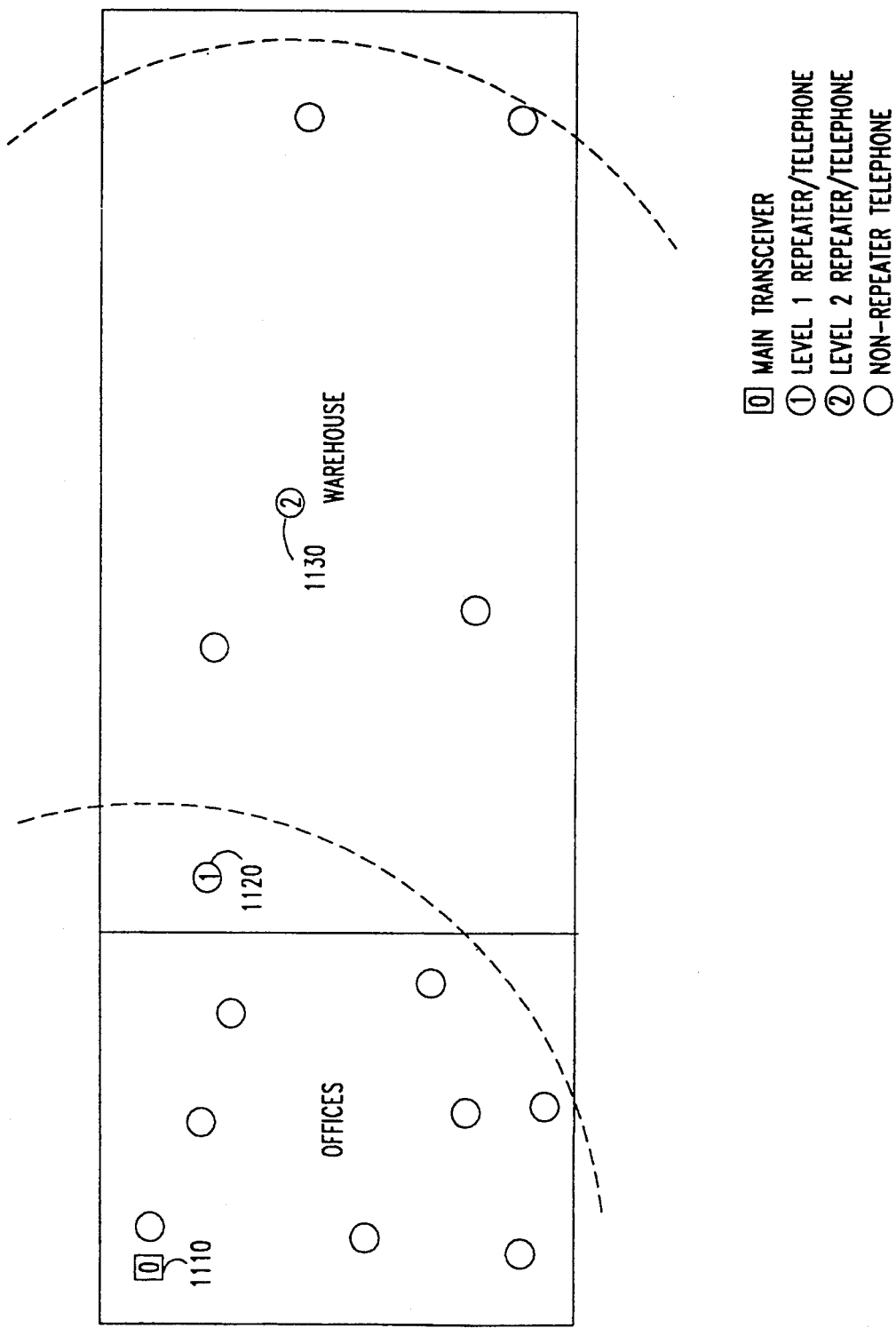

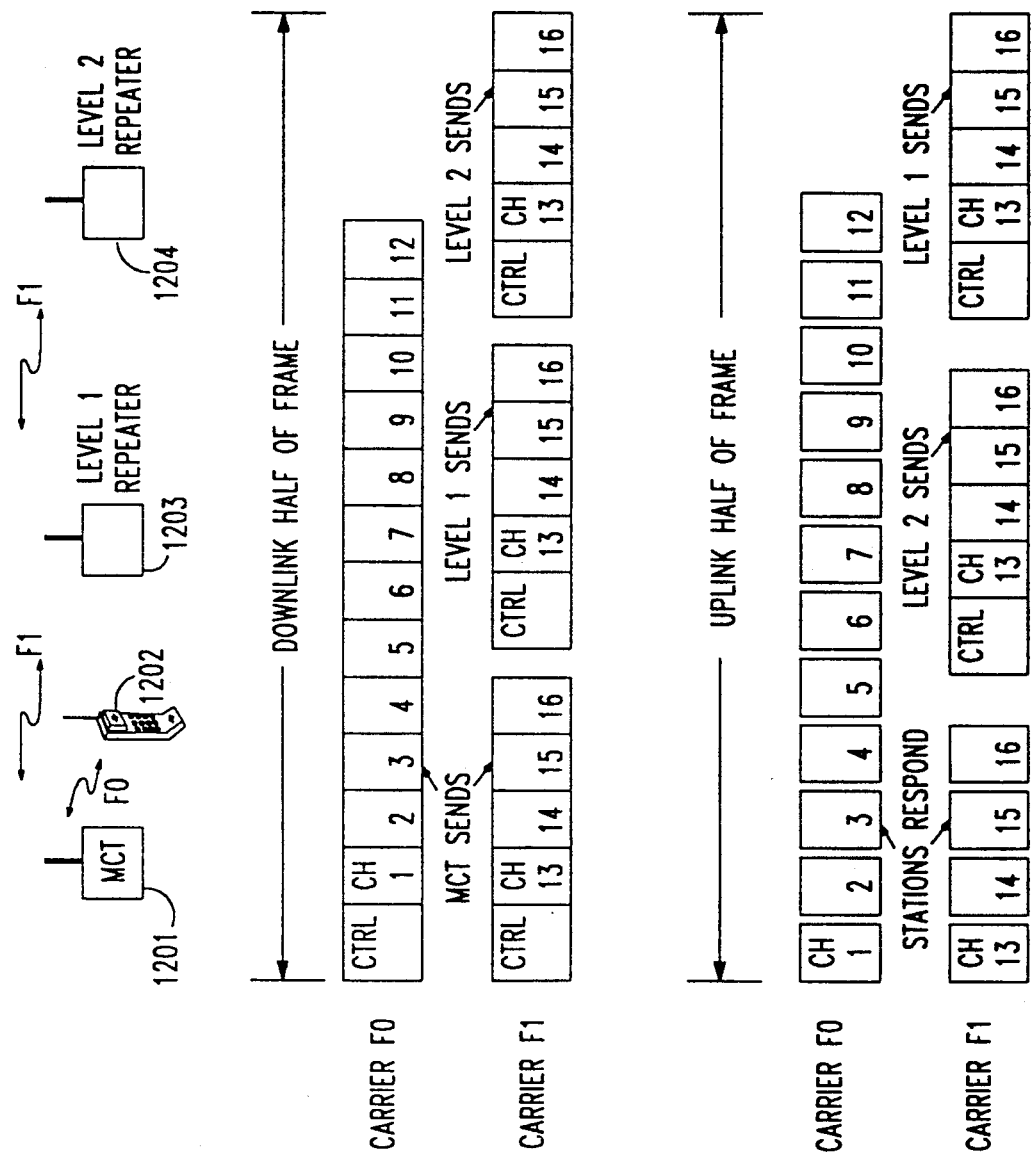
FIG. 12 FRAME STRUCTURE FOR TWO CARRIER SYSTEM

AUTOMATICALLY CONFIGURING WIRELESS PBX SYSTEM

BACKGROUND OF THE INVENTION

1. Field of the Invention

This invention relates to wireless private branch exchange (PBX) systems and more particularly to an arrangement for automatically configuring a plurality of terminals for operation within such a PBX system.

2. Description of the Prior Art

In a PBX (or Key) system, a number of lines are provided between a group of local users and a switch in the PBX system. Through these lines, the PBX system provides a certain number of accesses to a remote communications exchange and also provides access for the local users to each other. A call made to or from the remote communications exchange must first access the switch, which then routes the call to its destination. A call made from one local user to another must also access the switch which similarly routes the call to its destination. Even though the PBX switch reduces the number of lines between the group of local users and the remote communications exchange, a substantial amount of wiring is still required between the switch and the local users.

Both a customer and a manufacturer of PBX systems benefit when the amount of wiring required for installation of the PBX system is reduced. If installable by the customer, such a system, has the potential of saving both time and expense for the customer, while providing a marketing advantage for the manufacturer. Much of the equipment for small PBX systems is compact and self-contained enough for customers to install, but the wiring between the local units and the PBX switch generally requires outside help for both new installations and moves or rearrangements. If the wiring is eliminated or substantially simplified, most customers could install or rearrange the equipment as appropriate without assistance.

To this end, wireless multiple access communication systems have been successfully implemented in PBX type applications. An example of such a system is a spread spectrum wireless PBX system described in U.S. Pat. No. 4,672,658 which issued to M. Kavehrad, et al. on Jun. 9, 1987 In this system, each one of local user transceivers is matched to a separate one of multiple PBX transceivers. Although this system provide wireless communications, it does not readily permit customer installation or rearrangement of the system equipment. This system is also burdened by spread-spectrum technology which uses a fairly complex design.

Wireless multiple access communication systems have also been successfully implemented in certain other applications. For example, a mobile radio system simultaneously routes a plurality of private communications through a central base station which performs the switching necessary to interconnect the appropriate users, utilizing frequency shift keying (FSK) modulation and frequency division multiple access (FDMA). In this regard see, for example, U.S. Pat. No. 4,112,257 which issued to E. G. Frost on Sep. 5, 1978. Another radio system is the satellite-based communications system described in U.S. Pat. No. 4,291,409 which issued to A. Weinberg et al. on Sep. 22, 1981, wherein a central switching arrangement, phase shift keying (PSK) modulation and spread spectrum multiple access (SSMA) are used. Like the above described PBX system, these systems do not not readily permit customer installation or rearrangement of the system equipment. Site engineering or trial-and-error placement of equipment within the system is therefore generally required. Moreover, these systems are either limited in range due to transmitter power constraints that exist under present regulations, or are also burdened by complex spread-spectrum designs.

SUMMARY OF THE INVENTION

A wireless PBX system configured in accordance with the principles of the invention overcomes the above problems. Ease of installation without site engineering or trial-and-error placement of components within the system is facilitated. Moreover, functionality and ease of operation of the system are also provided. In its basic form and in preferred embodiments, the wireless PBX system consists of only two types of components: a control unit including a radio frequency transceiver; and fixed terminals, such as telephone stations and voice/data stations, which also include radio frequency transceivers. Portable handsets also may be included in the system to allow for customer mobility. The system therefore advantageously uses radio to achieve both wire replacement which allows for customer installation or rearrangement, and mobility which allows for customer convenience and productivity.

In accordance with one aspect of the invention, some of the fixed terminals are tasked to serve as radio repeaters so that area coverage may be expanded over that of a system employing a single base unit. With multiple stages or levels of repeaters, this coverage is significantly expanded. With two repeater levels, for example, the effective radius of coverage is increased approximately by a factor of 3 over a single base system.

In accordance with another aspect of the invention, the PBX system is installed simply by placing the system components in the desired locations at a premises, plugging them into line power, and performing some simple programming steps including a final step of initiating an automatic configuring process. This process, in preferred embodiments, advantageously causes the control unit in the base unit to exchange various radio messages with the terminals, decide which terminals should serve as repeaters, and determine an appropriate frame structure wherein time slots, in which transmissions may be repeated in order to extend the operating range for the system, are provided. A positive display indication at the control unit, following the end of the automatic configuring process, shows that all terminals are linked and that the system is operating normally.

In accordance with the principles of the invention, the invention includes an arrangement for automatically configuring a plurality of stations for operating in a wireless telephone system. This arrangement comprises a control unit for connecting to a switched network and a plurality of stations for communicating with the control unit over a wireless communication channel. The control unit comprises means for selecting at least a first one of the plurality of stations for providing telephone service with the control unit for selected second ones of the plurality of stations.

BRIEF DESCRIPTION OF THE DRAWING

FIG. 3 shows a typical radio coverage pattern for the wireless PBX system in accordance with the invention;

FIG. 4 shows a radio link protocol used in the communications between units within the wireless PBX system in accordance with the invention;

FIG. 5 shows a table illustrating a set of possible responses in the auto-configuring of multiple stations for operation in the wireless PBX system in accordance with the invention:

FIGS. 6, 7 and 8 show flow charts illustrating the operation of the wireless PBX system of FIG. 1 in executing a three stage auto-configure operation in accordance with the invention;

FIG. 9 shows a frame structure for use in an unconstrained wireless PBX system which supports four active users, in accordance with the invention;

FIG. 10 shows a frame structure for use in a specific wireless tuned PBX system which supports eight active users in accordance with the invention;

FIG. 11 shows a basic wireless PBX system that uses a main transceiver and two repeaters to achieve radio coverage throughout an office/warehouse type structure; and FIG. 12 shows a dual carrier wireless PBX system and frame structures for supporting these two carriers.

Throughout the drawings, the same element when shown in more than one FIG. is designated by the same reference numeral.

DETAILED DESCRIPTION

Figure 1:
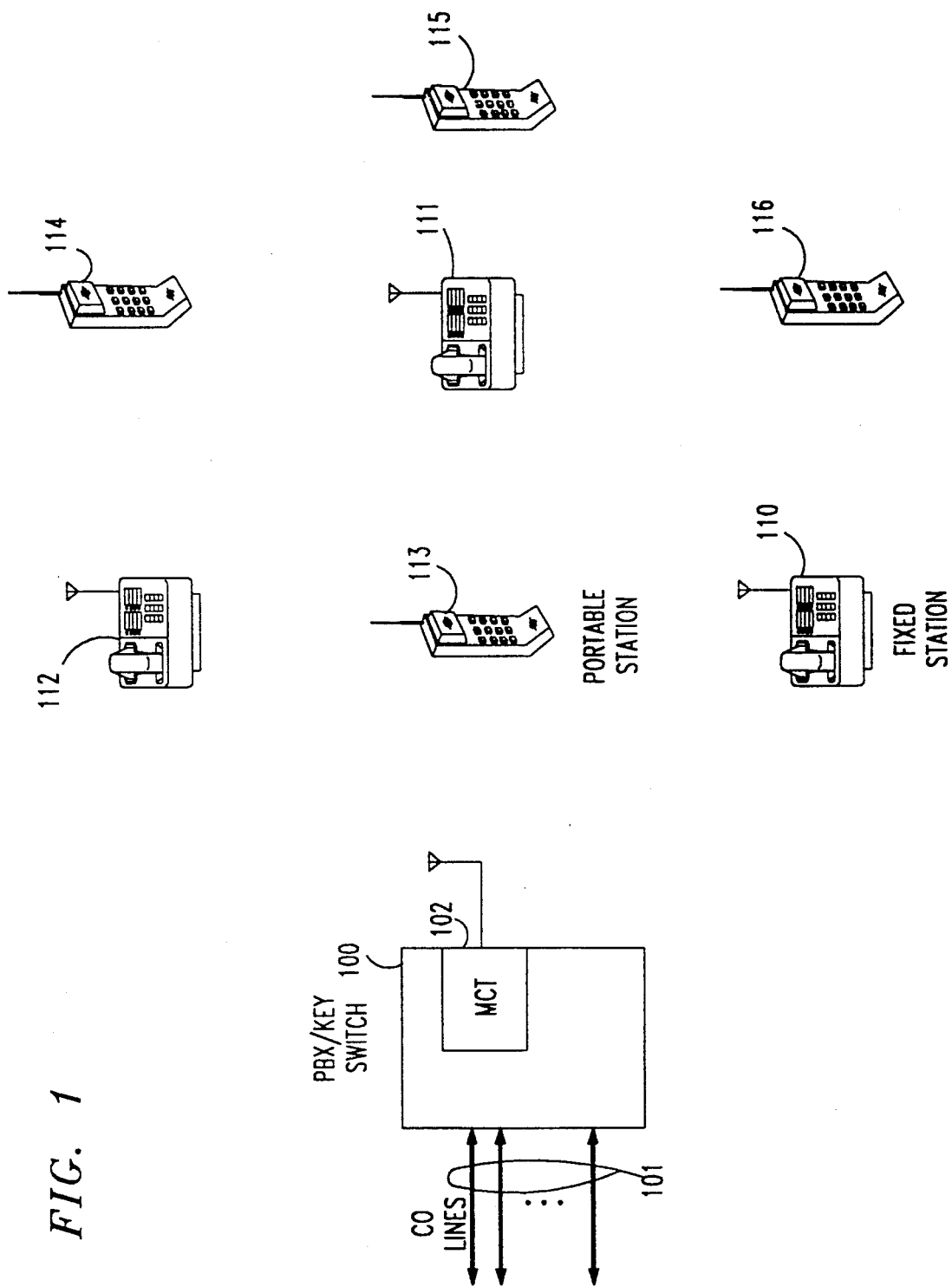
FIG. 1 is a diagram of a wireless private branch exchange (PBX) system including a PBX/KEY switch, multiple fixed location stations and multiple portable stations.

Referring now to FIG. 1, there is shown a wireless private branch exchange (PBX) system including a control module or PBX/KEY switch 100, multiple fixed location stations 110 through 112 and multiple portable stations 113 through 116. The switch 100 provides central office (CO) line termination for lines 101, switching capability, feature access and control for the stations 110 through 116. A main control transceiver (MCT) 102 in the switch 100 provides a station access interface via radio links, along with the intelligence to control a network of individual links, explained in greater detail later herein. The MCT 102 also provides system-wide timing, auto-configuring capability, and the ability to change frame structures as conditions vary. A frame structure is made up of a series of time slots in which transmissions are made initially by an originating unit and may also include slots in which these transmissions are repeated by a repeater unit in order to extend the operating range of the PBX system. A switch suitable for use as switch 100 is a MERLIN ® or PARTNER ™ switch (both available from AT&T) arranged for accommodating the MCT 102.

In accordance with the invention, the fixed location stations 110 through 112 are capable of serving as repeaters if they are determined to be needed as such by a system auto-configure operation, described later herein. These stations are expected to be moved only occasionally. When they are moved, the auto-configure operation is repeated. The portable stations 113 through 116 are not used as repeaters, but rather are free to be carried throughout the premises in which the system is installed. These portable stations 113 through 116 and the fixed location stations 110 through 112, which may be either desk or wall-mounted sets, communicate with the switch 100 via a wireless protocol which provides many of the attributes of the analog terminal line (ATL) protocol employed by AT&T in some of its wired communication switches such as the MERLIN switch. The wireless protocol employed in this invention provides control information over a radio path along with voice information between the switch 100 and each of the multiple stations 110 through 116.

Information between the switch 100 and the stations 110 through 116 is exchanged in three ways in accordance with the wireless protocol. First, the switch 100 transmits command messages via the radio path to a station. No response is required or expected of the station from the switch. Second, the switch 100 queries a station for information and a response message is expected. Lastly, a station transmits an unprompted message to the switch 100 and a response message may or may not be expected. These messages are exchanged during the time when the switch 100 polls each station. All messages received either by a station or the switch cause an acknowledgment to be returned to the sender. If the sender's message requires information to be returned, the returned information serves as the acknowledgement. If the sender's message does not require information to be returned, an explicit acknowledge message is returned. Such messages include, for example, a request for telephone service, dialed digits, the hold function as well as the transfer function for an incoming call.

Figure 2:
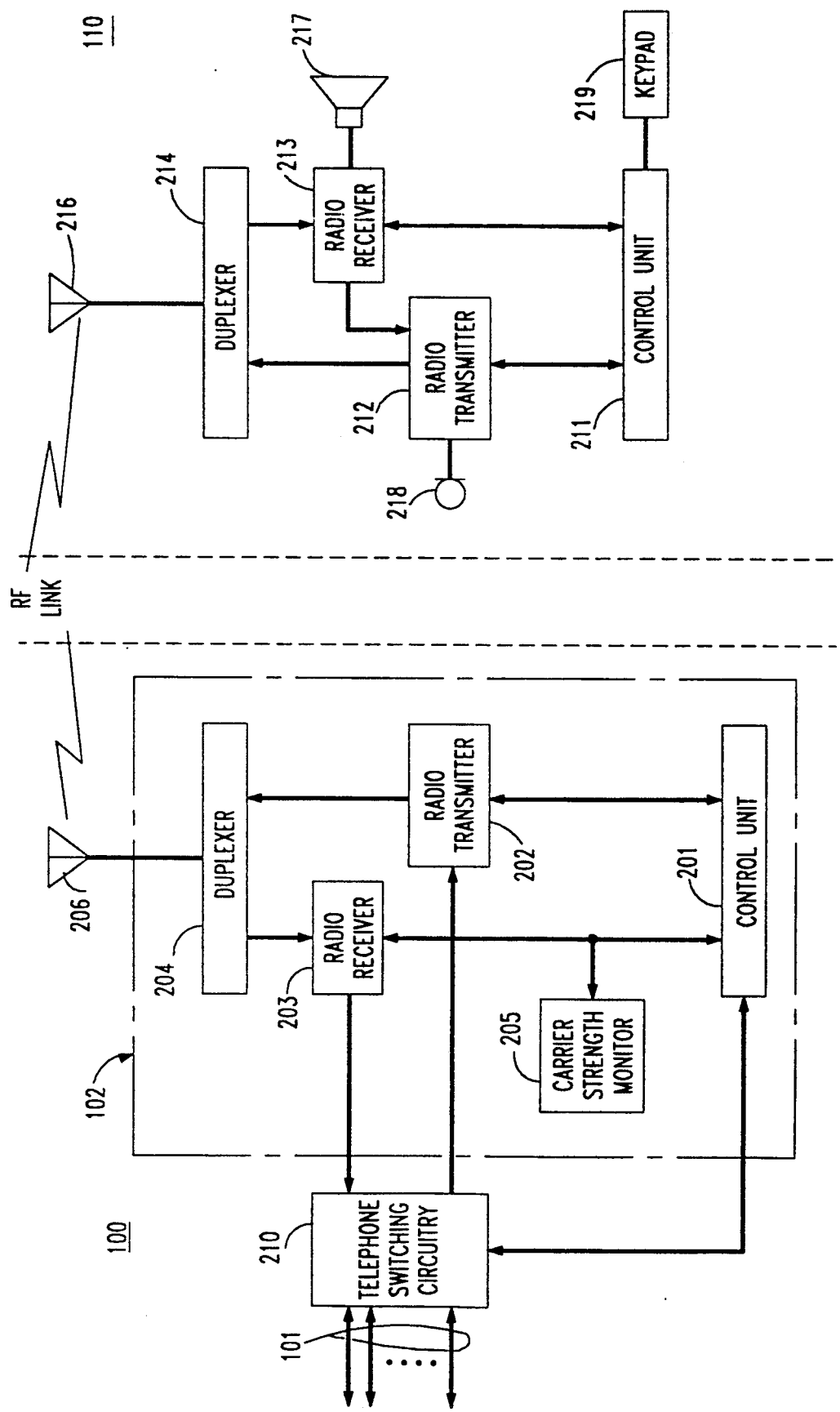
FIG. 2 is a block representation of the major functional components of the PBX/KEY switch and one of the multiple fixed stations, both depicted in FIG. 1 and operative in accordance with the invention.

Referring next to FIG. 2, there is shown a block representation of the major functional components of the PBX/KEY switch 100 and fixed station 110, both depicted in FIG. 1 and operative in a wireless PBX in accordance with the principles of the invention. With regard to the functional components illustratively described in station 110 and the communications between this unit and the switch 100, the fixed stations 111 and 112 of FIG. 1 incorporate these same basic components and are operationally identical. The portable stations 113 through 116 also incorporate these same components and communications format, but may not be configured as repeaters.

Communications between the MCT 102 and the station 110 are, advantageously provided via a time division multiplexing (TDM) format which provides a number of attractive characteristics for indoor radio communications. The TDM format permits a single transmitter/receiver pair to handle a number of subchannels simultaneously, with the selection of a desired subchannel being made with simple digital logic. All transmitted information is accessible to all receivers and multiple subchannels can be combined at any station to provide higher bandwidth services (also-called bandwidth on demand). Because radio frequency (RF) paths change very little during each frame, the transmission characteristics are virtually identical for a transmit and a receive direction of a duplex link.

The MCT 102 shown in the switch 100 of FIG. 1 is shown in greater detail in FIG. 2 and includes a control unit 201, a radio transmitter 202 and a radio receiver 203. The control unit 201 advantageously provides the intelligence to control the network of individual links between the MCT 102 and the stations 110 through 116. Control unit 201 may be implemented through the use of a microcomputer containing read-only-memory (ROM), random-access-memory (RAM) and through use of the proper coding. Such a microcomputer is known in the art and is readily available from semiconductor manufacturers such as Signetics, Intel and AMD.

Both the MCT 102 and the station 110 are operable on a plurality of communication channels. A carrier strength monitor 205 informs the control unit 201 of an available channel which would not interfere with other nearby radio systems. The control unit 201 configures the radio transmitter 202 and the radio receiver 203 in the MCT 102 for proper operation on the selected one of the plurality of channels when actively communicating with station 110. The control unit 201 also provides the appropriate channel control information to the station 110.

The transmit and receive signals of the MCT 102 are coupled to, by way of example, a time division duplexer 204 which permits the transmitter 202 and the receiver 203 to both operate at different times over antenna 206. The telephone switching circuit 210 provides central office line termination, switching capability, and feature access and control for the individual stations.

Referring next to the station 110, there is shown a control unit 211 which interfaces with the control unit 201 in the MCT 102 and controls the operation of the circuitry in the station 110. Like the control unit 201, this control unit 211 may be implemented through the use of a microcomputer containing ROM, RAM and through use of the proper coding. Such a microcomputer is known in the art and is readily available from semiconductor manufacturers such as Signetics, Intel and AMD.

Communications with the MCT 102 are provided via a radio transmitter 212 and a radio receiver 213 in the station 110. The output of the transmitter 212 and input for the receiver 213 are commonly coupled through a duplexer 214 to an antenna 216. In a first operating mode, the receiver 213 demodulates voice signals transmitted by the MCT 102 and couples these signals to an acoustical device such as, for example, loudspeaker 217. In a second operating mode, wherein the station also serves as a repeater station, control signals and voice signals from the radio receiver are coupled to an input of the radio transmitter where they are retransmitted in accordance with the radio link protocol described in detail later herein. The transmitter 212 also has as its input signals originating at the station which are speech signals from a microphone 218, a system identification number from control unit 211 and opcode data representative of entries on a keypad 219, all of which it transmits to the MCT 102. The key pad 219 is used for entering dial digits and control functions executable by the control unit 211 or transmitted to the MCT 102.

With TDM as the basic transmission format, and operating within the 900 MHz frequency range in a band 26 MHz wide, the band supports 13 RF carriers spaced at 2 MHz intervals. As is well known in the art, a wireless communication system is capable of operating at one of a selectable number of frequencies in order to avoid interference. Communication between the MCT 102 and the individual stations is provided with a 1 Mbps throughput, at approximately 0.5 Mbps in each direction. This rate is satisfactory for most applications. With 32 Kbps ADPCM voice channel coding, an approximately 1 Mbps system allows up to 12 duplex voice channels with ample system and station overhead for each carrier.

Referring now to FIG. 3, there is shown a typical radio coverage pattern for the wireless system in accordance with the invention. The coverage of each transceiver (transmitter and receiver combination) is shown as a circle for illustrating a typical range of coverage provided by each unit. The MCT or level 0 unit controls the radio operation and provides the basic coverage. And the level-1 transceivers are all located within the radius of the MCT coverage. The level-2 transceivers are located within the radius of one or more level-1 transceiver units thereby obtaining coverage from one of these units. Although the repeaters are shown at the limit of the range of coverage, they, of course, may be otherwise located. No wiring to the remote units is needed other that that which provides line power.

FIG. 4 shows the basic radio link protocol used in communications between units within the wireless PBX system. This link protocol uses a basic frame which is separated into 6 segments 410 through 460 with each segment being used for sending control and voice channel information from a specific set of units. These six frame segments are also defined in Table I which illustrates the use of these segments. In the table, downlink refers to messages being sent from a CU, such as CU 201 shown in FIG. 2, to the stations or from the repeaters to the stations. And uplink refers to those messages being sent to the CU from both the stations and the repeaters. Although the frame allows for two levels of repeaters, fewer segments are required with fewer levels.

Table I-Activity in Various Frame Segments

1-Downlink from level-0 (CU)
2-Downlink from level-1 repeater
3-Downlink from level-2 repeater
4-Uplink from individual stations
5-Uplink from level-2 repeater
6-Uplink from level-1 repeater shown in FIG. 4 along with the six segments are expanded views of some of the segments for illustrating the type of control information required for system operation. Each frame interval begins with a transmission by segment 410 from the CU. As seen in the expanded view of this segment, a preamble that allows receivers to recover clock and achieve timing recovery is provided in a field 411. All messages to the repeaters and individual stations start with this preamble. A timing pattern is inserted in this preamble to provide a reset for system clocks to insure that all subsequent transmissions are synchronized. A system identification (ID) number 412 is also provided in messages to and from each station to insure that each station is communicating with the correct wireless system. A system control signal 413 is provided for operations such as informing the stations of the need to change carrier frequency if interference or noise on a carrier in use is detected.

The parameters of the frame structure are identified in a frame descriptor field 414 provided to the stations. A two bit field 415 is used to identify the segment number. The CU sends 0,0 and the next level repeaters update the segment number. This number allows a station which may only hear one of the first three segment transmissions to know when to transmit (segment 4) back to the CU. Field 416 contains the address of a specific station and field 417 contains any control information for its operation. Voice channels 418, typically 1 through 12, complete the segment 410. These voice channels are described in greater detail later herein and with reference to FIGS. 9 and 10.

Field 417 may provide control information in a number of ways for controlling the operation of the stations. The information provided by field 417 may, for example, be used to assign a given voice channel for a particular station when that station has requested service. This station control field may also be used to instruct a fixed station to be a level-1 or level-2 repeater. Those stations that are configured as repeaters demodulate the incoming packet, store the data until the next segment, then repeat the control portion of the packet with the segment number increased by 1. When a station obtains communications through a repeater station, the repeater station also repeats the voice channel for that station.

The system is arranged to accommodate a total of 32 different telephone stations, even though a greater or lesser number of stations may be easily employed in a wireless PBX system in accordance with the principles of the invention. Each station is addressed by every 32nd frame when the full number of stations are employed in the system. When a smaller number of stations are employed in the system, a fewer number of frames accordingly may be provided. And succeeding frames just add one to the immediately preceding station address for identifying each next station to be addressed in the system. If the time to cycle through a frame is relatively long, however, i.e., a few milliseconds, more than one station may be also addressed per frame.

The level-1 repeaters generate the message, or a portion of it, during the second segment 420 with the two bit field updated to 1. The level-2 repeaters regenerate the message, or a portion of it during the third segment 430 with the two bit field identifying the segment number updated to 2.

In transmissions back to the CU, each station responds in a station status field 441 in segment 440 within a frame that contains that station's address. The response may be a status indication or a request for service. One bit of the status information is also used to identify whether a station is fixed or portable. When a station has been assigned a voice channel by the CU, that station responds with voice information at the appropriate time in segment 440, for example, voice channel 422. In segments 450 and 460, the level-2 and then level-1 repeaters take any station status and voice channel responses received without error during segment 440, and send them respectively in fields, for example fields 461 and 462 in segment 460. A field 463 is also provided for any repeater status messages that may be necessary. Thus messages received from stations with high quality are forwarded from level-2 repeaters to level-1 repeaters in segment 450. And messages received with high quality from stations or level-2 repeaters are forwarded from level-1 repeaters in segment 460.

The message protocol includes check bits in each channel transmission, so that the MCT 102, a station or repeater can recognize whether the message received is accurate and take appropriate action. Stations may (nominally) receive the same information in more than one time segment but with different quality. The station accepts the first error-free message it receives during segment 410, 420 or 430, and looks no further once it is received. The station also rejects all errored messages. Similarly, messages that contain errors are not forwarded through repeaters. If after reading the check bits, a repeater finds it has received a message containing an error, the repeater does not forward this message. Also, in order of priority, error-free messages received from a portable station directly by the MCT 102 are used first and the repeated versions ignored. Similarly, error-free messages from the portable station received from a level level-1 repeater and provided to the MCT 102 are used over those received from a level-2 repeater.

Referring next to FIG. 5, there is shown a table illustrating a set of possible responses in the auto-configuring of a 15 station system and how these stations are linked (telephone service established) to the MCT 102 in the PBX/KEY switch 100, both shown in FIG. 1. When beginning the auto-configuring operation, the MCT 102 is unaware of the number of stations in the system and thus cycles through 32 addresses, the maximum number assumed for this system. In the interest of drawing clarity, however, the responses for stations 25 through 41 are not shown. After the customer has located the fixed stations where they are needed, the portable stations are placed in remote sites on premises where the customer wants service, to insure that the system provides coverage in these locations.

Once the fixed stations are plugged into line power and turned on, the system ID number and station address are entered into each of these stations by the customer. The system ID number is obtained from a system code provided by the manufacturer with the switch 100. The station address typically comprises a 2 digit station ID number, for example, 10 through 41 which is assigned sequentially by the customer. The system ID number and station address are similarly entered into each portable station in the same manner. An extra character is entered in the highest numbered station so that during programming (and after), the MCT 102 will know that this station is the last station in the system. Security for the system is provided by this numbering scheme since an unrelated station within the reception range of the MCT 102 will not be able to communicate in this system because it will have a different system ID code than any of the properly recognized stations in the system. Even if the system ID number is fraudulently obtained, the station address of the unrelated station would require a station address higher than the properly recognized last station in the system. And the MCT 102 will not accept communications from stations other than the ones that it has previously recognized during the auto-configuring operation.

After the sytem ID number and station address have been entered into each station but before the auto-configuring operation begins, the stations have their transmitters off. Their receivers, however, begin scanning the available carrier frequencies looking for messages from the MCT 102 with the entered system ID number. The scan cycle for a station receiver to examine all 13 carrier frequencies is approximately 1 second, so initial transmissions from the MCT 102 allow for a station to be on the wrong carrier for a short time.

In order for the auto-configuring operation to begin, the MCT 102 first finds a clear (no interferers nearby) carrier frequency. Selection of a carrier frequency starts with the MCT 102 measuring receive power on each carrier frequency and choosing the one with the lowest power. Once a carrier frequency is established the MCT 102 sets up a simple two segment frame, since there are at this point in the operation no repeaters in the system, and begins transmitting. The elements of the frame are, for example, those shown in the first and fourth segments 410 and 440 of FIG. 4. The transmission is repeated to insure that all stations within range of the MCT 102 are able to monitor the carrier frequency, verify the system ID number, and respond with a station status when the MCT 102 sends the appropriate address. The station status includes the fixed/portable indicator, a signal quality measure, e.g., received power, and a bit showing whether the station has the highest address in the system.

The auto-configuring operation is initiated by activating a switch located on the MCT 102. When this button is activated, all the stations receiving the correct system ID number from the MCT 102 have their respective transmitters turned on and the auto-configuring operation is executed.

The information shown in FIG. 5 is an illustrative example of that which may be stored in a table in memory in the CU 201 of FIG. 2 during three passes of the auto-configuring operation, described in greater detail later herein and with reference to FIGS. 6, 7 and 8. A "0" entry indicates no (or low quality) response, an "F" indicates good quality, fixed station response, and a "P" is a good quality, portable response. As noted above, when beginning the auto-configuring operation, the MCT 102 is unaware of the number of stations in the system and thus cycles through 32 addresses. If all entries were "F" or "P" in the first pass, the system would be configured with no repeaters and nothing more would have to be done. In the illustrative table, however, there are several "0" entries in this first pass and the MCT 102 is unaware of the number of stations in the system.

For the second pass, the MCT 102 changes to a four segment frame for one level of repeating. The elements of this frame are, for example, those shown in the segments 410, 420, 440 and 460 in FIG. 4. During the transmission of these new frames, stations 11, 13, 14, 17, 18, and 21 (the known fixed stations) are instructed to serve as level-1 repeaters. The unlinked stations are sequentially addressed and responses are looked for. During the second pass, the table shows that the use of stations 11 and 18 as level-1 repeaters set up links to four more stations, 10, 16, 23, and 24. Moreover, the response from station 24 shows it has the highest address, so the MCT 102 from this pass is made aware of the number of stations in the system and that only two more stations (12, 20) need to be linked. The blank entries in the second row are "don't cares" and represent stations that are already linked.

For the third pass, the MCT 102 shifts to a six segment frame as shown in FIG. 4 to allow for two levels of repeating. Stations 11, and 18 serve as level-1 repeaters and stations 10, 16, and 24 are sequentially instructed to act as level-2 repeaters. The unlinked stations are addressed and responses are looked for. With station 16 set as a level-2 repeater, the remaining two stations 12 and 20 become part of the system. The final system thus uses stations 11 and 18 as level-1 repeaters and 16 as a level-2 repeater. Upon completion of the third pass, a positive display indication at the MCT 102, which shows that all stations are linked and that the system is operating normally, is provided.

Referring now to FIGS. 6, 7 and 8, there is shown in each of these FIGS. flow charts illustrating the operation of the wireless PBX system in executing a three stage auto-configure operation in accordance with the invention. Generally the three stages of the auto-configure operation respectively correspond to the first, second and third pass levels depicted in the illustrative example provided by the auto-configuration table of FIG. 5. The functions jointly provided by control unit 201 and illustratively, control unit 211, responsive to control unit 201, both shown in FIG. 2, are advantageously determined by a process or program respectively stored in ROM associated with each of these control units.

In the first stage of the auto-configure operation, the process is entered at step 601 where a counter A is initially set to a count of 10. This count is set during an initialization step when the process is first initiated and corresponds to the station address of the first one of the stations in the wireless PBX system. From step 601, the process advances to decision 602 where the number stored in step 601 is examined. If the count is less than 41 in counter A, then the process advances to step 603 where each of the stations are polled by the control unit 201 with a first control signal, the control unit providing this polling by sending out a station address corresponding to each of the individual stations. If a polled station does not respond, which is detected in decision 604, the process advances to step 605 where a 0 flag, previously described herein with reference to FIG. 5, is set. The process next advances to step 606 wherein the counter A is incremented by one. From the step 606, the process returns to the step 601.

If while polling a station, a response is detected by the decision 604, the process advances to decision 607 where a determination is made as to the type of station, i.e., either a fixed station or a portable station. If the type of station is a fixed station, then the process advances to the step 608 where the F0 flag described in FIG. 5 is set. If the decision 607 determines that the station is not a fixed station, then the process advances to step 609 where the P flag, which corresponds to a portable station, is set. From either step 608 or step 609, the process advances to the decision 610 where a determination is made as to whether the station then being addressed has been programmed to indicate that it is the highest or last address in the system. When 32 stations are employed in the system, this station will have address number 41. When fewer stations are employed, however, then the last one of these stations is programmed so that in its response to the control unit, it includes information that it is the last station in the system.

If at decision 610, the station then being addressed is not the last one of the stations in the system, the process goes to the step 606 where the counter A is advanced and the station address for the next expected station in the system is generated by the process. If at decision 610, the station then being addressed provides information that it is the last station in the system, the process advances to step 611 where the L flag is set, this flag corresponding to the last station in the system. From the step 611, as well as from the decision 602, the process advances to decision 612 where a determination is made as to whether any 0 flags were set during the polling operation. If there were no 0 flags set, the process advances to decision 613 where it checks to see if the L flag is set. If the L flag is set, then the auto-configure process is complete and the process is exited. If a 0 flag is detected in decision 612 or the L flag not detected in decision 613, the process advances to the second stage of the auto-configure operation.

With reference to FIG. 7, there is shown the second stage of the autoconfigure operation. The process is entered at step 701 where a counter B is initially set to a count of 10. This count is set during an initialization step when the process is first initiated. From the step 701, the process advances to decision 702 where the number or station address then stored in counter 701 is examined. If the count is less than 41 in counter B, then the process advances to decision 703 where a determination is made as to whether an F0 flag described earlier herein with reference to FIG. 5 has been assigned to the station corresponding to the number then stored in counter B. If the F0 flag is not assigned to the station number then being examined, the process advances to the decision 704 where a determination is made as to whether the L flag is assigned to this station address. If the L flag is not assigned to this station address, the process advances to the step 705 wherein the counter B is incremented by one. From the step 705, the process returns to step 701.

If in decision 703, the F0 flag has been assigned to the station address then being examined, the process advances to step 706 where that particular station is configured as a level-1 repeater by a second control signal provided by the control unit 201. As a level-1 repeater, this station attempts to communicate with those stations that the MCT 102, shown in FIG. 2, was unable to reach. This station is thus configured to receive and then send out the station addresses for those stations that to this point in the process have not been linked. Thus from the step 706, the process advances to step 707 where a counter C is set to a count of 10 reflecting the lowest address assigned to a station in the system.

From step 707, the process advances to decision 708 where the count or station address contained in step 707 is examined. If the count is less than 41 in counter C, then the process advances to step 709 where the station whose address is currently stored in counter C is polled with a third control signal by the control unit contained in the fixed station then selected by the process at decision 703. If the polled station does not respond, which is detected in decision 710, the process advances to step 711 wherein the counter C is incremented by one. From the step 711, the process returns to the step 707.

If a response from the polled station is detected by the decision 710, this response is provided as a fourth control signal to the control unit 201 by the control unit contained in the fixed station then selected. The process then advances to decision 712 where a determination is made as to whether a 0 flag had been assigned to this station. If the 0 flag was not assigned to this station, it reflects that this station had been addressed by the control unit 201 and the process goes to step 711. If the 0 flag was assigned to this station, it reflects that this station was not addressed by the control unit 201 and the process goes to step 713 where an R1 flag is set for the station determined at decision 703. The R1 flag designates the station identified at decision 703 as a level-1 repeater to be used in subsequent communications with the new station identified at decision 710.

From the step 713, the process advances to the decision 714 where a determination is made as to the type of station, i.e., either a fixed station or a portable station. If the type of station is a fixed station, then the process advances to the step 715 where the F1 flag, which corresponds to a fixed station found with one repeater, is set. If the decision 714 determines that the station is not a fixed station, then the process advances to step 716 where the P flag, which corresponds to a portable station, is set. From either step 715 or step 716, the process advances to the decision 717 where a determination is made as to whether the station then being addressed is the last station in the system.

If at decision 717, the station then being addressed is not the last one of the stations in the system, the process goes to the step 711 where the counter C is advanced and the fixed station selected at decision 703 will attempt to contact any of the remaining unlinked stations in the system. If the station addressed at decision 717 is the last one of the stations in the system, the process advances to the step 718 where the L flag is assigned to this just detected station. From this step 718, as well as from decision 708, wherein 32 station addresses have been generated, the process goes to the step 705 where the counter B is advanced and the next detected fixed station will look for any stations remaining undetected within the system in the just described manner.

Once the count of 41 has been exceeded in decision 702 or the L flag has been detected in decision 704, the process advances to decision 719 where a determination is made as to whether any 0 flags remain set after the polling operation. If there are no 0 flags still set, the process advances to decision 720 where it determines whether the L flag is set. If the L flag is set, then the auto-configure process is complete and the process is exited. If a 0 flag is detected as being set in decision 719 or a L flag not detected in decision 720, then the process advances to a third and final stage of the auto-configure operation.

Referring next to FIG. 8, there is shown the third stage of the auto-configure operation. The process is entered at step 801 where a counter D is initially set to a count of 10. This count is set during an initialization step when the process is first initiated. From the step 801, the process advances to decision 802 where the number or station address then stored in counter 801 is examined. If the count is less than 41 in counter B, then the process advances to decision 803 where a determination is made as to whether an F1 flag has been assigned to the station address corresponding to the number then stored in counter D. If the F1 flag is not assigned to the station address number then being examined, the process advances to the decision 804 where a determination is made as to whether the L flag is assigned to this station address. If the L flag is not assigned to this station address, the process advances to the step 805 wherein the counter D is incremented by one. From the step 805, the process returns to step 801.

If in decision 803, the F1 flag has been assigned to the station address then being examined, the process advances to step 806 where that particular station is configured as a level-2 repeater. As a level-2 repeater, this station attempts to communicate with those stations that the level-1 repeaters were unable to reach during the second stage of the auto-configure operation. This station is thus configured to receive and then send out station addresses for those stations that to this point in the process have not been linked. Thus from the step 806, the process advances to step 807 where a counter E is set to a count of 10 reflecting the lowest address assigned to a station in the system.

From step 807, the process advances to decision 808 where the count or station address contained in step 807 is examined. If the count is less than 41 in counter E, then the process advances to step 809 where the station whose address is currently stored in counter C is polled by the control unit contained in the fixed station then selected as a level-2 repeater by the process at decision 803. If the polled station does not respond, which is detected in decision 810, the process advances to step 811 wherein the counter E is incremented by one. From the step 811, the process returns to the step 807.

If a response from the polled station is detected by the decision 810, the process advances to decision 812 where a determination is made as to whether a 0 flag is then assigned to this station. If the 0 flag is not assigned to this station, it reflects that this station has been successfully addressed either by the control unit 201 in the first stage or by a level-1 repeater in the second stage of the auto-configure operation. The process then goes to step 811. If the 0 flag is assigned to this station, however, it reflects that this station was not addressed by the control unit 201 nor a level-1 repeater and the process goes to step 813 where an R2 flag is set Thus the total number of slots for the station determined at decision 803. The R2 flag designates the station identified at decision 803 as a level-2 repeater to be used in subsequent communications with the new station identified at decision 810.

From the step 813, the process advances to the decision 814 where a determination is made as to the type of station, i.e., either a fixed station or a portable station. If the type of station is a fixed station, then the process advances to the step 815 where the F2 flag, which corresponds to a fixed station found with two repeaters, is set. If the decision 814 determines that the station is not a fixed station, then the process advances to step 816 where the P flag, which corresponds to a portable station, is set. From either step 815 or step 816, the process advances to the decision 817 where a determination is made as to whether the station than being addressed is the last station in the system.

If at decision 817, the station then being addressed is not the last one of the stations in the system, the process goes to the step 811 where the counter E is advanced and the fixed station selected at decision 803 will attempt to contact any of the remaining unlinked stations in the system. If the station addressed at decision 817 is the last one of the stations in the system, the process advances to the step 818 where the L flag is assigned to this just detected station. From this step 818, as well as from decision 808, wherein 32 station addresses have been generated, the process goes to the step 805 where the counter D is advanced and the next detected fixed station will look for any stations remaining undetected within the system in the just described manner.

Once the count of 41 has been exceeded in decision 802 or the L flag has been detected in decision 804, the process advances to decision 819 where a determination is made as to whether any 0 flags remain set after the polling operation. If there are no 0 flags still set, the process advances to decision 820 where it determines whether the L flag is set. If the L flag is set, then the auto-configure operation is complete and the process is exited. At this point in the process, all of the station sets in the system can communicate with the MCT 102. If a 0 flag is detected as being set in decision 819 or a L flag not detected in decision 820, then the auto-configure operation fails and the customer would in this instance have to move some of the more remote stations closer to other of the stations in the system. Alternatively, for those few distant and isolated stations, a repeater-only type of station may advantageously be used in communicating with these stations.

A frame structure for the wireless PBX system may be selected from a number of alternate configurations, depending upon the requirements of the customer. Time slots in a frame all may be allocated to the MCT 102 or level-0 and have only two segments 410 and 440 as shown in FIG. 4. These time slots also may be allocated in varying proportions to level-0 and to level-1 repeaters and employ four segments 410, 420, 440 and 460 also shown in FIG. 4. These time slots may further be allocated in varying proportions to level-0 and to level-1 and level-2 repeaters, and employ the six segments 410, 420, 430, 440, 450 and 460 shown in FIG. 4. In order for the wireless PBX system to operate within the allotted frequency band, the total number of time slots in a frame must remain the same regardless of the number and level of the repeaters assigned. Thus the total number of slots available for use only by the MCT 102 or a combination of the MCT 102 and only level level-1 repeaters or a combination of the MCT 102 and both level level-1 and and level-2 repeaters are the same regardless of which combination is selected and in what proportions it is employed.

Referring next to FIG. 9, there is shown a frame structure for an unconstrained system which supports four active users. In this FIG., only the voice channel portions of segments 910, 920, 930, 940, 950 and 960 are shown. Each of these segments have approximately the same length and have time slots in each segment dedicated to voice channels 1 through 4. The advantage of this frame structure is that a user of the system is not constrained as to location. Four active users may be simultaneously provided telephone service by the MCT 102 or by any mix of transceivers. Hand-off from the MCT 102 to a repeater or from one repeater to another or even from one level to another is easily accomplished because a time slot in use is dedicated throughout the coverage of the system. Thus different repeater units may establish links to a portable station at different times as the portable station is moved about the premises. Unfortunately, the capacity of the system is low (only ⅓ of a system without repeaters) because of the unusable time slots if the users happen to be clustered near the MCT 102. The inefficiency comes about because this unconstrained system assumes that three slots must be set aside for all active users so that all users could be served by the level-3 repeaters, if needed. If some users are served by the MCT 102 unit or the level 1-repeaters, time slots go to waste. Although this system only suports four duplex voice channels, it provides a straightforward implementation that is sufficient for between 10 and 20 telephone stations, depending upon traffic considerations.

Referring now to FIG. 10, there is shown a frame structure for a specific tuned system. With this frame structure, a more bandwidth efficient system is provided which allows stations to be located anywhere in the area of coverage. This system differs from the unconstrained system shown in FIG. 9 in that this system utilizes time slots (or equivalently, bandwidth) more efficiently. As seen in FIG. 10 the voice channel portion of the segments 1010, 1020, 1030, 1040, 1050 and 1060 have different lengths. By allocating a priority to the time slots given to the different levels of repeaters, the tuned system is able to handle more active users (be more bandwidth efficient) at the expense of reducing the number of simultaneous users possible at the periphery of the system. The frame structure for the specific tuned system supports five level-0 users, two level-1 users, and one level-2 user. Channel 1 supports the users (one at a time) in the region of level-2 repeaters. Channels 2 and 3 support users in level-1 regions, and channels 4 through 8 support users in the vicinity of the MCT 102. Eight simultaneous users may therefore be accommodated. Thus, the system may be tuned or engineered to the expected traffic patterns at a specific customer site.

Table II shows a simple equation for the various ways of allocating time slots and some of the integral solutions of the equation (one solution for each of the possible total number of users). The variables $U_j$ represents the number of users served by level j units. Each user in the level j coverage region needs $j+1$ time slots allocated.

TABLE II

| Some Integral Solutions for $U_0 + 2U_1 + 3U_2 = 12$ | | | |
|---|---|---|---|
| $U_0$ | $U_1$ | $U_2$ | Total Users |
| 12 | 0 | 0 | 12 |
| 10 | 1 | 0 | 11 |
| 8 | 2 | 0 | 10 |
| 7 | 1 | 1 | 9 |
| 5 | 2 | 1 | 8 |
| 3 | 3 | 1 | 7 |
| 2 | 2 | 2 | 6 |
| 1 | 1 | 3 | 5 |
| 0 | 0 | 4 | 4 |

The last allocation in Table II corresponds to the unconstrained system described earlier herein and shown in FIG. 9.

Referring next to FIG. 11, there is shown, by way of example, a relatively simple system that uses a main transceiver 1110, one level-1 repeater 1120 and one level-2 repeater 1130 to achieve radio coverage throughout an office/warehouse type structure. In an open warehouse, a coverage radius of a few hundred feet is easily achieved. This is much larger than is normally achieved in an office environment. The transceiver 1110 is located at one end of the offices where central office lines are terminated. The first repeater (level-1) is located to cover a large part of the warehouse, with the level-2 repeater covering the remainder.

Each repeater/telephone has the capability to handle its own communications, provide repeater functions, and serve as a temporary base for a portable station being carried about the premises. Selection of the 8 channel system described earlier herein with reference to FIG. 10 would match the needs of a customer requiring a configuration such as is shown in FIG. 11. In the event of a power failure, an uninterruptible power supply is provided for the transceiver 1110 and one or more telephone stations. The portable stations are also usable within the radius of coverage of the transceiver 1110 during loss of power.

Various modifications of this invention are possible and may be made within the scope of the invention. One such modification of this invention is a dual carrier system and frame structures for providing support therefor, as is shown in FIG. 12. A dual, or multiple carrier, system advantageously provides higher capacity, and avoids interference both from nearby systems and from other devices operating in the same frequency band. An MCT 1201 contains two transceivers operating with identical TDMA frame timing, but with different frame structures on the different RF carriers. The MCT 1201 communicates with stations such as station 1202 in its region primarily on carrier frequency F0, and reserves carrier frequency F1 for communication with the repeaters such as level-1 repeater 1203 and level-2 repeater 1204. The repeaters are similar to those described previously herein in that each contains a single transceiver.

For upgrading an existing wireless system already in the field to the two carrier system shown in FIG. 12, additional hardware in the MCT 1201 is required. Only software modifications are required, however, in the remainder of the system. Since the MCT 1201 may be manufactured with a spare circuit slot for an RF circuit that may be added later, upgrading a single carrier system to a dual carrier system is relative easy.

This two carrier system is suitable for the system described earlier herein and shown in FIG. 11. Many small businesses have relatively large locations wherein a large portion of the telephone users will be located relatively close to one another, while a smaller portion of the users are distributed about the premises in a less dense fashion. Thus the dual carrier system isolates the distant users from the large number of level 0 users, preserving capacity in the level 0 region.

By considering the two carriers independently, the capacity of a dual carrier system may be demonstrated. Carrier F0 can support up to twelve simultaneous users if it is devoted to serving users that do not require the use of a repeater. Carrier F1 is governed by the equation $2U_1 + 3U_2 = 12$, some solutions of which are shown in the first three columns of Table III. The fourth column of Table III shows the total capacity when the users on F0 are included.

TABLE III

| Sample Capacity Figures for Dual Carrier System | | | |
|---|---|---|---|
| $U_1$ | $U_2$ | F1 Users | Total Users |
| 6 | 0 | 6 | 18 |
| 5 | 0 | 5 | 17 |
| 4 | 1 | 5 | 17 |
| 3 | 2 | 5 | 17 |
| 2 | 2 | 4 | 16 |
| 1 | 3 | 4 | 16 |
| 0 | 4 | 4 | 16 |

The last line of Table III indicates the "worst-case" situation for the dual carrier system, where all the distant users are located far from the MCT 1201. In this case, carrier F1 is able to support four of these users, and the system overall can support 16. When comparing this case to the last line of Table II, it is seen that the dual carrier approach can accommodate four times as many users in this situation. Two carriers would be needed in any event when the number of simultaneous voice channels required by the customer exceeds 12.

It is thus understood that various other modifications of this invention are possible and may obviously be resorted to by those skilled in the art without departing from the spirit and scope of the invention as hereinafter defined by the appended claims.

We claim:

1. A wireless telephone system comprising:
    a control unit for connecting to a switched network; and
    a plurality of stations for communicating with the control unit over a wireless communication channel, the plurality of stations being dispersed so as to divide a location of the telephone system into multiple areas from which telephone service for each area is provided by one of the plurality of stations located in an associated one of the multiple areas, the control unit including means for configuring at least a selected first one of the plurality of stations for simultaneously providing telephone service with the control unit for both the area associated with said selected first one of the plurality of stations and for areas associated with selected second ones of the plurality of stations located outside of the communication range of the control unit, and wherein the control unit includes means for storing a unique signal code for communicating with each of the plurality of stations and comparison means for comparing said unique signal code with a signal code received in said control unit from each of the plurality of stations requesting service, the comparison means causing the control unit to be unresponsive to any requests for service from a station not providing said unique signal code recognized by the control unit.

2. The wireless telephone system as in claim 1 wherein the selected first one of the plurality of stations includes control means responsive to control signals indicating origin and destination addresses from either the control unit or a one of the selected second ones of the plurality of stations, the selected first station receiving and retransmitting the control signals to the control unit or to the one of the selected second ones of the plurality of stations in accordance with the contents of the control signal.

3. The wireless telephone system as in claim 1 wherein at least a one of the selected second ones of the plurality of stations is configurable by the control unit for providing telephone service with the control unit for selected third ones of the plurality of stations located outside of the communication range of both the control unit and the selected first one of the plurality of stations.

4. The wireless telephone system as in claim 3 wherein the selected second one of the plurality of stations includes control means responsive to control signals indicating origin and destination addresses from either the selected first one of the plurality of stations or a one of the selected third ones of the plurality of stations, the one of the selected second ones of the plurality of stations receiving and retransmitting the control signals to the selected first one of the plurality of stations or to the selected third one of the plurality of stations in accordance with the contents of the control signal.

5. The wireless telephone system as in claim 4 wherein the selected second one of the plurality of stations is configured for providing telephone service with the control unit by control signals provided to the selected second one of the plurality of stations by the selected first one of the plurality of stations, the selected second one of the stations providing telephone service with the control unit for the selected third ones of the plurality of stations.

6. The wireless telephone system as in claim 1 wherein the unique signal code comprises a base number generated by the control unit and an additional number provided by each station to the control unit during an auto-configuring operation, the additional number corresponding to the address for each of the plurality of stations.

7. The wireless telephone system as in claim 6 wherein the station address for a last one of the plurality of stations in the wireless system contains an additional character for identifying said last one of the plurality of stations for the control unit during the auto-configuring operation.

8. The wireless telephone system as in claim 1 wherein the control unit comprises means for providing a frame structure for communications between the control unit and the plurality of stations, the frame structure being operable for determining both a first number of time slots available for providing telephone service between the control unit and selected first ones of the plurality of stations, and a second number of time slots available for providing telephone service between the selected first ones of the plurality of stations and the selected second ones of the plurality of stations.

9. The wireless telephone system as in claim 8 wherein the control unit further comprises means for providing multiple carriers, each of the plurality of stations being configured by the control unit for communicating therewith over one of the plurality of carriers, and each carrier having a configurable frame structure for providing selectable telephone service for the plurality of stations operating thereon.

10. The wireless telephone system as in claim 9 wherein at least one of the plurality of stations is a portable station.

11. In a wireless telephone system, an arrangement for automatically configuring a plurality of stations for operating in said system, the arrangement comprising:
 a control unit for connecting to a switched network; and
 a plurality of stations for communicating with the control unit over a wireless communication channel, the plurality of stations being dispersed so as to divide a location of the telephone system into multiple areas from which telephone service for each area is provided by one of the plurality of stations, the control unit comprising means for selecting at least a first one of the plurality of stations during an auto-configuring operation for simultaneously providing telephone service with the control unit for both the area associated with said selected first one of the plurality of stations and for areas associated with said selected second ones of the plurality of stations, and wherein the control unit includes means for storing a unique signal code for communicating with each of the plurality of stations and comparison means for comparing said unique signal code with a signal code received in said control unit from each of the plurality of stations requesting service, the comparison means causing the control unit to be unresponsive to any requests for service from a station not providing said unique signal code recognized by the control unit.

12. The arrangement for automatically configuring a plurality of stations for operating in a wireless telephone system in accordance with claim 11 wherein the control unit further comprises means for generating a first control signal over the communication channel, each of the plurality of stations receiving the control signal responding over the channel to the control unit for establishing communication with the control unit.

13. The arrangement for automatically configuring a plurality of stations for operating in a wireless telephone system in accordance with claim 12 wherein the means for selecting at least the first one of the plurality of stations further includes means for detecting those stations responding to the first control signal, responsive to the detecting means, the generating means generating a second control signal over the communication channel to those stations responding to the first control signal and selecting from these stations the at least first one of the plurality of stations for providing telephone service with the control unit for selected second ones of the plurality of stations.

14. The arrangement for automatically configuring a plurality of stations for operating in a wireless telephone system in accordance with claim 13 wherein the at least first one of the plurality of stations includes means for generating a third control signal over the communication channel for establishing communication with the selected second ones of the plurality of stations, the at least first one of the plurality of stations further including means for detecting those stations responding to the third control signal, responsive to the detecting means, the generating means in the at least first one of the plurality of stations generating a fourth control signal over the communication channel to the control unit, the fourth control signal being indicative of those stations responding to the third control signal and these stations being the selected second ones of the plurality of stations.

15. A method of configuring a plurality of stations for operation in a wireless telephone system, the method comprising the steps of:
    connecting a control unit to a switched network, the control unit being arranged for communicating over a wireless communication channel;
    configuring a first station for communicating over the communication channel and for operating as a repeater for a more remote station upon receipt of a signal from the control unit, the first station simultaneously operating as a station for originating and receiving calls directed to it and as a repeater station for providing communications between the control unit and the more remote unit,
    storing in the control unit a unique signal code for communicating with each of the plurality of stations; and
    comparing said unique signal code with a signal code received in said control unit from each of the plurality of stations requesting service, the control unit being unresponsive to any requests for service from a station not providing said unique signal code recognized by the control unit.

16. A wireless PBX comprising:
    a first telephone station;
    central control means for interconnecting said first telephone station with a telephone network via a first wireless communications channel between said first telephone station and said control means; and
    a second telephone station interconnected to said central control means via a communications channel which includes a second wireless communications channel between said second telephone station and said first telephone station and which further includes said first wireless communications channel, and wherein the central control means includes means for storing a unique signal code for communicating with each of the telephone stations and comparison means for comparing said unique signal code with a signal code received in said control unit from each of the telephone stations requesting service, the comparison means causing the central control means to be unresponsive to any requests for service from a station not providing said unique signal code recognized by the central control means, the central control means configuring said first telephone station for simultaneously operating as a station for originating and receiving calls directed to it and as a repeater station for communicating calls between the telephone network and said second telephone station via both the first wireless communications channel and the second wireless communications channel.

17. A central control unit for use in a wireless PBX which includes at least first and second telephone stations, said central control unit comprising:
    means for connecting said central control unit to a telephone network;
    means for establishing a direct wireless connection between said central control unit and said first telephone station; and
    means for establishing a repeatered wireless connection between said central control unit and said second telephone station, said repeatered wireless connection including said first telephone station, and wherein said control unit includes means for storing a unique signal code for communicating with each of the first and second telephone stations and comparison means for comparing said unique signal code with a signal code received in said control unit from each of the first and second telephone stations requesting service, the comparison means causing the control unit to be unresponsive to any requests for service from a station not providing said unique signal code recognized by the control unit, the control unit configuring said first telephone station for simultaneously operating as a station for originating and receiving calls directed to it and as a repeater station for operating within said repeatered wireless connection, said first telephone station communicating calls between said central control unit and said second telephone station via both the direct wireless connection and the repeatered wireless connection.

18. A wireless PBX system comprising:
    a central control unit and a plurality of wireless telephone stations which permit originating and receiving calls at each station, said central control unit comprising:
    means for establishing a wireless telephonic communications channel with each of said wireless telephone stations and for simultaneously interconnecting said wireless communications channels to a telephone network, ones of said wireless telephonic communications channels being unrepeatered and at least one other of them being a repeatered channel which includes at least one of said unrepeatered channels;
    means for storing a unique signal code for communicating with each of the plurality of stations; and
    comparison means for comparing said unique signal code with a signal code received in said control unit from each of the plurality of stations requesting service, the comparison means causing the control unit to be unresponsive to any requests for service from a station not providing said unique signal code recognized by the control unit.

19. A plurality of telephone stations for use in a wireless PBX system which includes a central control unit for interconnecting said telephone stations with a telephone network via a wireless communications channel between said telephone stations and said control unit, a first one of the telephone stations comprising:

means for establishing a direct wireless connection between said central control unit and said first one of the telephone stations;

means for establishing a repeatered wireless connection between said central control unit and a second one of the telephone stations, said repeatered wireless connection existing simultaneously with said direct wireless connection; and means for simultaneously operating as a station for originating and receiving calls directed to said first station and as a repeater station for operating within said repeatered wireless connection for communicating calls between said central control unit and said second telephone station via both the direct wireless connection and the repeatered wireless connection, and wherein the control unit includes means for storing a unique signal code for communicating with each of the plurality of stations and comparison means for comparing said unique signal code with a signal code received in said control unit from each of the plurality of stations requesting service, the comparison means causing the control unit to be unresponsive to any requests for service from a station not providing said unique signal code recognized by the control unit.

20. A method of operation for a central control unit arranged for use in a wireless PBX which includes a plurality of telephone stations, said method comprising the steps of:

connecting said central control unit to a telephone network;

storing in said central control unit a unique signal code for communicating with each of the plurality of telephone stations, the control unit being unresponsive to any requests for service from a station not providing a unique signal code recognized by the control unit;

establishing a direct wireless connection between the control unit and each one of said plurality of telephone stations;

using as a repeater a first one of the plurality of telephone stations with which a direct wireless connection between the control unit and said first one of the plurality of telephone stations is established for establishing a repeatered wireless connection between the control unit and a second one of said plurality of telephone stations with which a direct wireless connection is not established during the establishing step; and configuring said first telephone station for simultaneously operating as a station for originating and receiving calls directed to it and as a repeater station for operating within said repeatered wireless connection, said first telephone station communicating calls between said central control unit and said second telephone station via both the direct wireless connection and the repeatered wireless connection.

* * * * *